United States Patent
Howard

(10) Patent No.: US 11,074,793 B2
(45) Date of Patent: Jul. 27, 2021

(54) SYSTEM, APPARATUS AND METHOD FOR INVENTORY

(71) Applicant: Omni Consumer Products, LLC, Addison, TX (US)

(72) Inventor: Stephen Howard, Dallas, TX (US)

(73) Assignee: Omni Consumer Products, LLC, Addison, TX (US)

( * ) Notice: Subject to any disclaimer, the term of this patent is extended or adjusted under 35 U.S.C. 154(b) by 0 days.

(21) Appl. No.: 16/698,917

(22) Filed: Nov. 27, 2019

(65) Prior Publication Data

US 2020/0273305 A1 Aug. 27, 2020

Related U.S. Application Data

(60) Provisional application No. 62/772,604, filed on Nov. 28, 2018.

(51) Int. Cl.
| | |
|---|---|
| G08B 13/24 | (2006.01) |
| G07C 9/00 | (2020.01) |
| G08B 13/19 | (2006.01) |
| G08B 13/196 | (2006.01) |

(52) U.S. Cl.
CPC ....... *G08B 13/246* (2013.01); *G07C 9/00309* (2013.01); *G08B 13/19* (2013.01); *G08B 13/1961* (2013.01); *G08B 13/248* (2013.01); *G08B 13/2454* (2013.01); *G08B 13/2462* (2013.01); *G07C 2009/00515* (2013.01)

(58) Field of Classification Search
CPC .................................................. G08B 13/246
See application file for complete search history.

(56) References Cited

U.S. PATENT DOCUMENTS

| | | | |
|---|---|---|---|
| 7,633,512 B2 | 12/2009 | Nakajima et al. | |
| 2008/0001753 A1* | 1/2008 | Claudatos | G06Q 20/203 340/572.1 |
| 2009/0306820 A1* | 12/2009 | Simmons | G07F 9/105 700/244 |
| 2010/0019905 A1* | 1/2010 | Boddie | G06Q 10/087 340/572.1 |
| 2013/0002879 A1* | 1/2013 | Weber | G08B 13/2462 348/159 |
| 2013/0134178 A1 | 5/2013 | Lu | |
| 2016/0098831 A1* | 4/2016 | Glickman | G06T 7/0008 705/28 |

OTHER PUBLICATIONS

International Search Report and Written Opinion on PCT/US2019/063815 dated Feb. 3, 2020.

* cited by examiner

*Primary Examiner* — Travis R Hunnings
(74) *Attorney, Agent, or Firm* — Foley & Lardner LLP

(57) ABSTRACT

An inventory system, apparatus and method. The method to be used in a cooler that includes a power module provides power to the inventory system from an electric source, battery, WIFI charge, wireless charge and/or combination thereof, a computer processor coupled to the power module, a memory module coupled to the computer processor, an image capturing module coupled to the processor, a movement module coupled to the processor; wherein the movement module triggers the image capturing device to capture images of products in a cooler due to a movement.

12 Claims, 5 Drawing Sheets

SYSTEM, APPARATUS AND METHOD FOR INVENTORY

FIELD OF THE INVENTION

This disclosure relates to a system, method and apparatus for inventory determination. More particularly, this disclosure relates to identifying and reporting inventory information.

BACKGROUND OF THE INVENTION

It is common for merchandisers, retailers, store owners and the like to need details in relation to goods, inventory and consumer habits. For example, it has become useful to learn trends relating to product display, inventory replenishing, employee activity, consumer activity, etc. In many cases, the trends are needed in real time. However, it is costly to hire individuals to collect such information. Some devices were developed to help collect such information. Unfortunately, such devices tend to obstruct passage, look unattractive, produce inaccurate data, and present many other issues.

Therefore, there is a need for an improved system, apparatus and method for retrieving such details.

SUMMARY

Embodiments described herein relate to an inventory method, apparatus and system. The method includes a power module provides power to the inventory system from an electric source, battery, WIFI charge, wireless charge and/or combination thereof, a computer processor coupled to the power module, a memory module coupled to the computer processor, an image capturing module coupled to the processor, a movement module coupled to the processor; wherein the movement module triggers the image capturing device to capture images of products in a cooler due to a movement.

BRIEF DESCRIPTION OF DRAWINGS

Reference will now be made to the following drawings.

DETAILED DESCRIPTION

Figure 1:
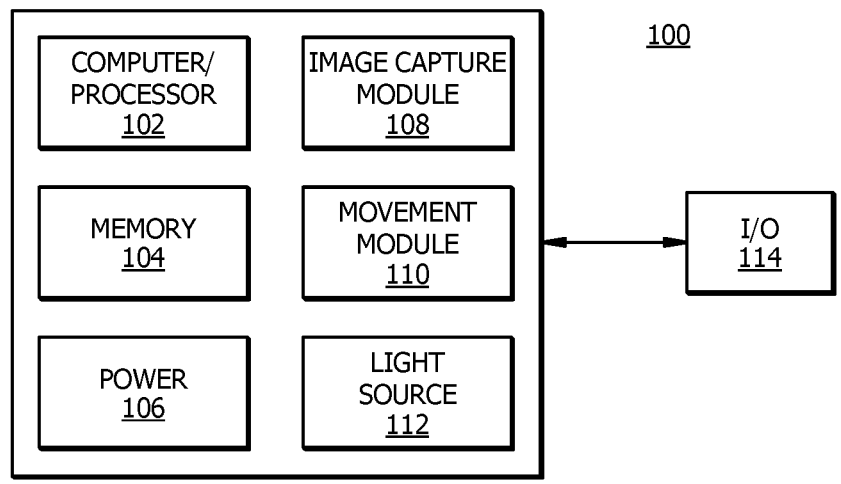
FIG. 1 is an embodiment of schematic diagram of an inventory apparatus.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware or combining software and hardware implementation that may all generally be referred to herein as a "circuit," "module," "component," or "system" (including firmware, resident software, micro-code, etc.). Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wire line, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is an embodiment of schematic diagram of an inventory apparatus 100. The inventory apparatus 100 includes processor/computer 102, memory 104, power module 106, image capturing module 108, movement module 110, light source 112 and I/O (input/output) 114. Image capturing module 108 may be a camera, video apparatus, computer, or any other mechanism capable of capturing an image. The image capturing apparatus 108 may be capable of taking an array of images, perform image filtering, perform image training, process images, use triangulation, learn pixel relation, develop a numeric value representative of an item captured based on the image(s) taken or processed, and/or other image related processing. The image capturing apparatus 108 may include firmware for movement interpretation and image recognition. An example is the Carmine 1.08 3D sensor from PrimeSense of Tel-Aviv, Israel. Another example is the Xbox Kinect from Microsoft of Redmond, Wash. Image capturing module 108 may provide image data in the form of streaming video at the rate of 30 frames per second in a standard 640×480 VGA. The image capturing device 108 may provide distance-to-target or general distance information. The capturing module 108 may utilize the light source 112.

Processor 102 may execute software or any computer readable code. Software may include executable routine for coordination and execution of the system functions and may utilize data in memory 104. The processor 102 may communicate with any database, such as, an SQL, Oracle, etc. The software module may include facial recognition routine, store mapping, product data/modules and location mapping. Processor 102 maybe coupled to any I/O 114. Such connection may be wired, wireless, at the same location or remote.

The power module 106 may be any wireless or wired power generation module. It may utilize one or more batteries and may report the life and/or condition of the battery. The battery maybe in a "click-on" compartment that allows for changing the battery without the need to change the casing. In other cases, the power module 106 may use electric power plug, power over WIFI or any power source.

The movement module 108 may utilize an accelerometer or any devise capable of identifying movement or change in location. In one embodiment, the movement module 108 utilizes a threshold to determine if a movement is sufficient to be considered a movement as mentioned in FIG. 2-FIG. 4. If a movement does not meet a threshold, the methods in FIG. 2-FIG. 4 would not consider a movement has occurred.

Figure 2:
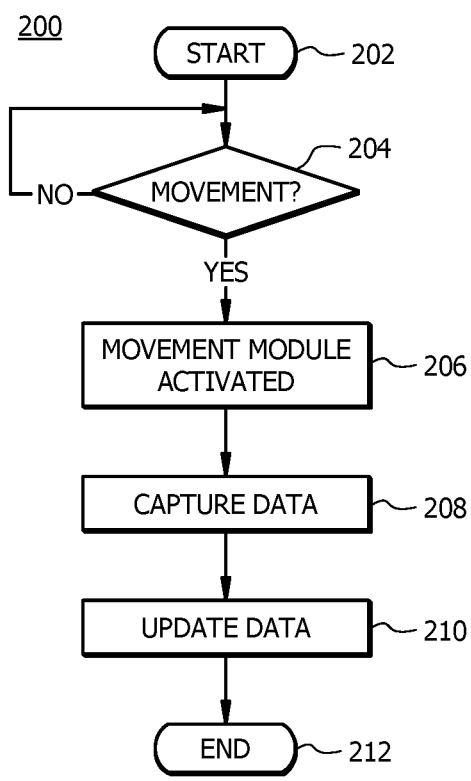
FIG. 2 is a flow diagram of an embodiment of an install method for the inventory apparatus.

FIG. 2 is a flow diagram of an embodiment of an install method 200 for the inventory apparatus. The method 200 starts at step 202 and proceeds to step 204, during which the method 200 determines if there is a movement. If there is no movement, the method 200 returns to step 202. If there is a movement, the method 200 proceeds to step 206. At step 206, the method 200 captures data for activation and to self-learn. For example, the method captures its store location, isle location, identification data, shelf related information, and/or other installation information. The method 200 may self-calibrate, set/reset time, etc. At step 210, the method 200 updates data based on the captured images, i.e. delta between images. The update maybe local and/or the method 200 may report/broadcast all or portion of such data. The method 200 ends at step 212. Installing method 200 may be triggered by an external software, such as an application on a mobile device or a driver on a computer. The method 200 may also be self-starting or self-install/initialized on powerup. In one embodiment, the data or information is also learned from a database that would have the actual data or cross-referenced to determine the data.

Figure 3:
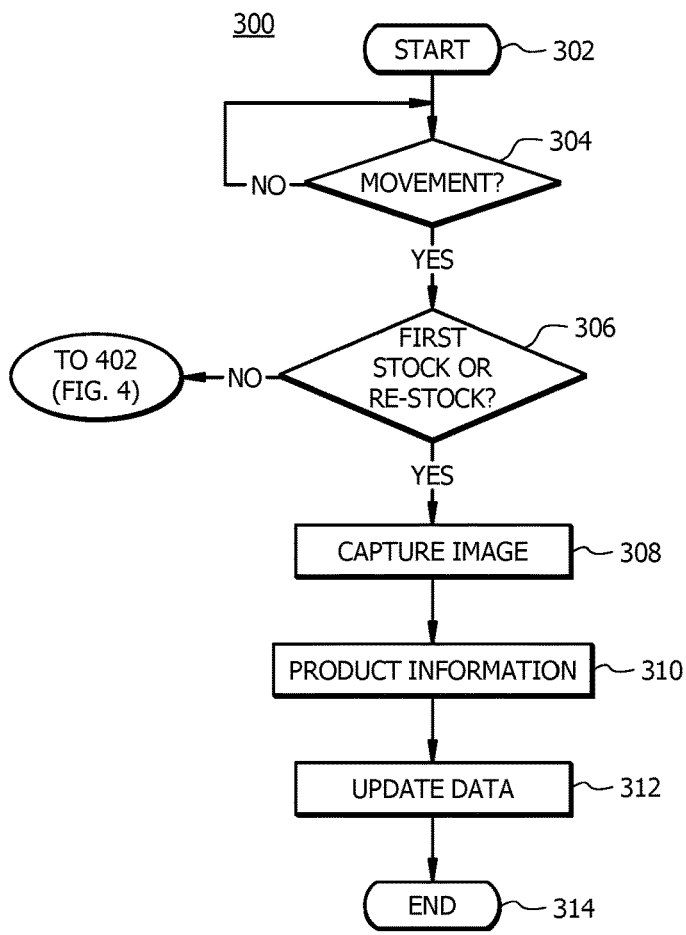
FIG. 3 is a flow diagram of an embodiment of an first stocking method for the inventory apparatus.

FIG. 3 is a flow diagram of an embodiment of a first stocking method 300 for the inventory apparatus. The method 300 starts at step 302 and proceeds to step 304. At step 304, the method 300 determined if there is a movement. If there is no movement, the method 300 returns to step 302; otherwise, the method 300 proceeds to step 306. At step 306, the method 300 determines if this is a first stock or a restock, where there were no products and a first product is being added or if products are being added to move around. If first stock/restock, the method proceeds to step 308; otherwise, the method 300 proceeds to FIG. 4. At step 308, the method 300 captures an image. At step 310, the method 300 determines product information based on the captured image. As such, the method 300 may utilize a database to retrieve more information and/or cross-reference the determined data with other archived data, i.e. a planogram or product shelf lineup information. At step 312, the method 200 updates data based on the previous steps. The method 300 ends at step 314.

Figure 4:
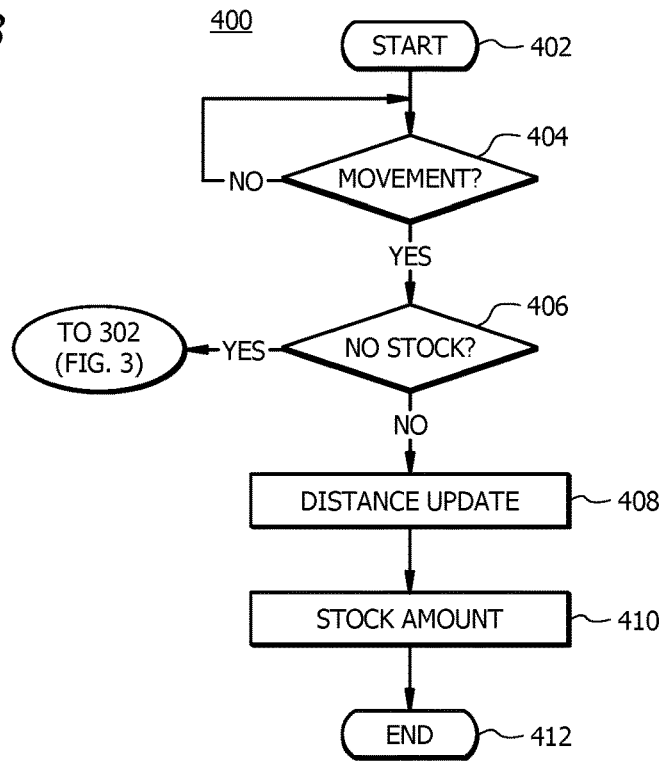
FIG. 4 is a flow diagram of an embodiment of an inventory method for the inventory apparatus.

FIG. 4 is a flow diagram of an embodiment of an inventory method 400 for the inventory apparatus. The method 400 starts at step 402 and proceeds to step 404. At step 404, the method 400 determines if there is a movement or a change in the cooler. If there is no movement or there is no change, the method 400 returns to step 402; otherwise, the method 400 proceeds to step 404. In step 404, the method 400 determines if there is no stock or a change in stock on shelf. If there is stock (inventory exists), then the method 400 proceeds to step 408; otherwise, the method 400 proceeds to FIG. 3. At step 408, the method 400 determines if there is a distance to the closet product or a count change in the number of products on a shelf (determining the delta between images). At step 410, based on the distance or number change, the method 400 updates the inventory/stock amount. The method 400 ends at step 412.

The method 200, 300 and/or 400 may be utilized by the inventory apparatus to improve its calculations, loop back information to refine the data being used, get real-time data and/or to update database information.

Figure 5:
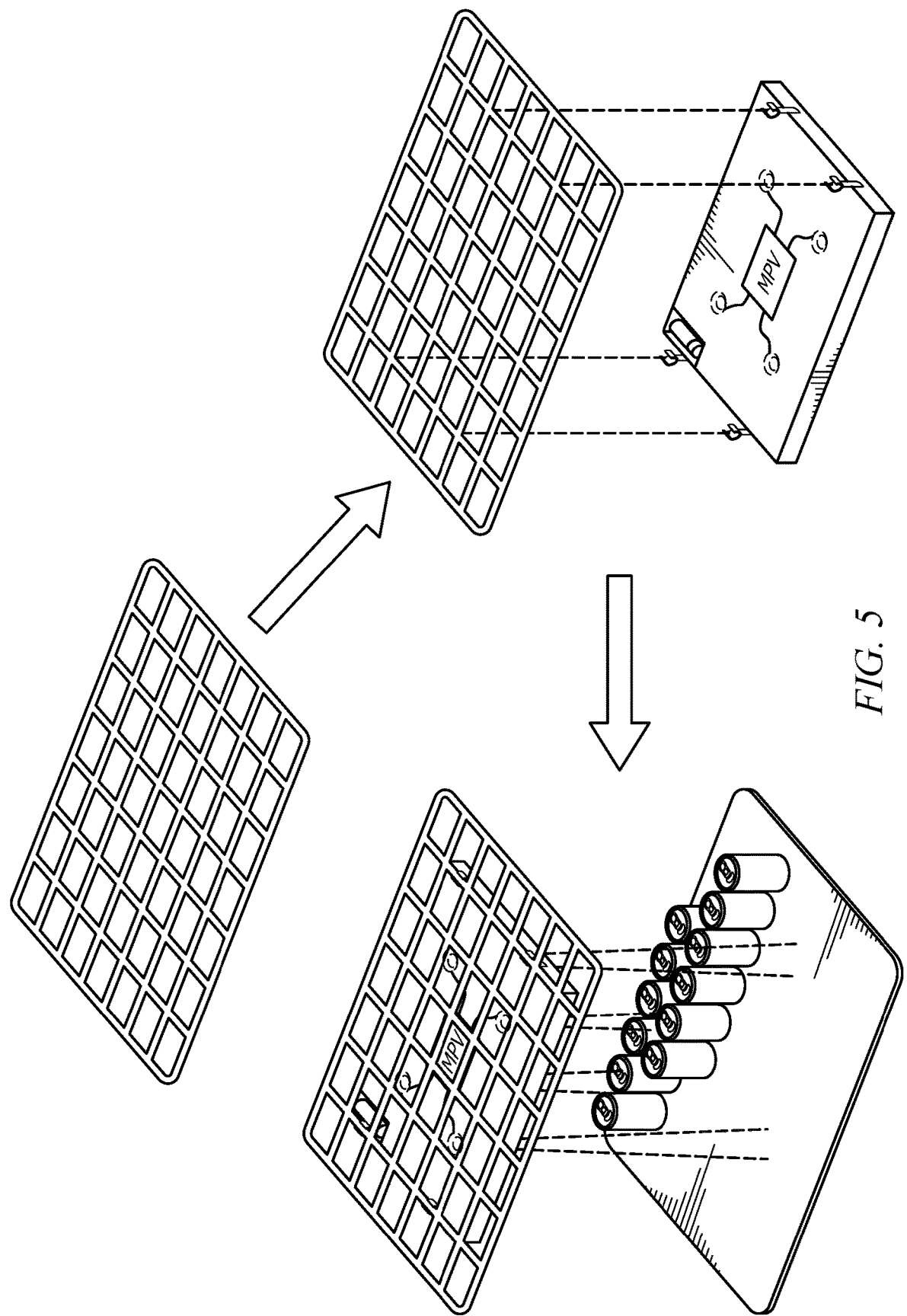
FIG. 5 is an embodiment of an inventory system.
Figure 6A:
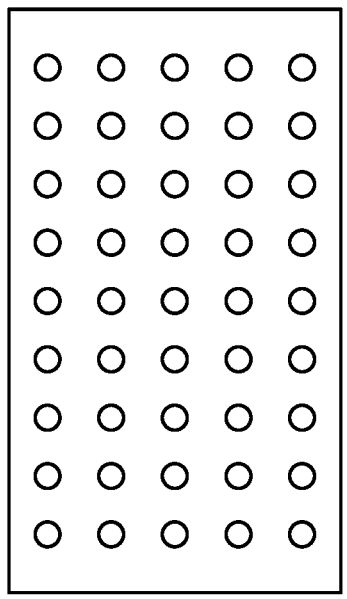
FIG. 6A-6H are embodiments of an tray inventory system.
Figure 6B:
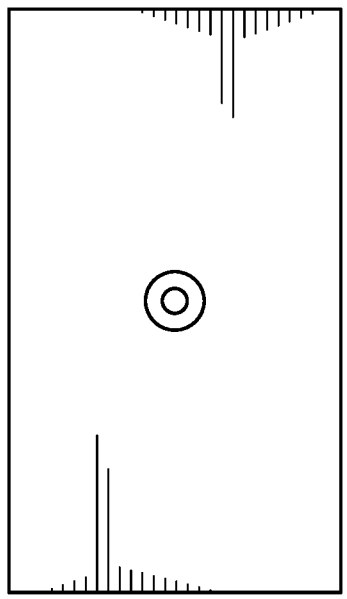
Figure 6C:
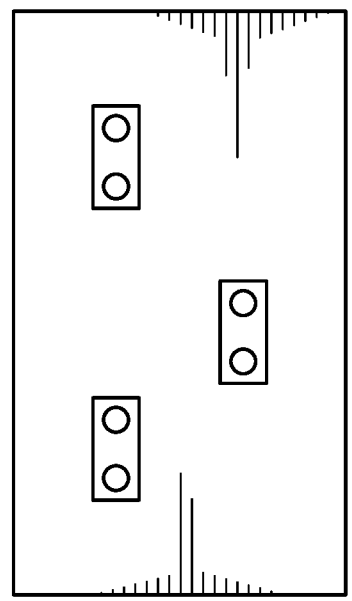
Figure 6D:
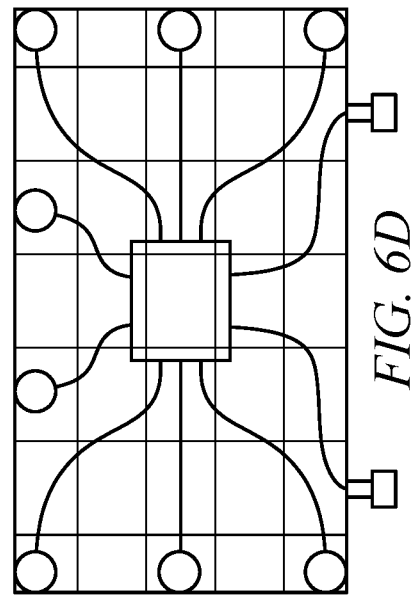
Figure 6F:
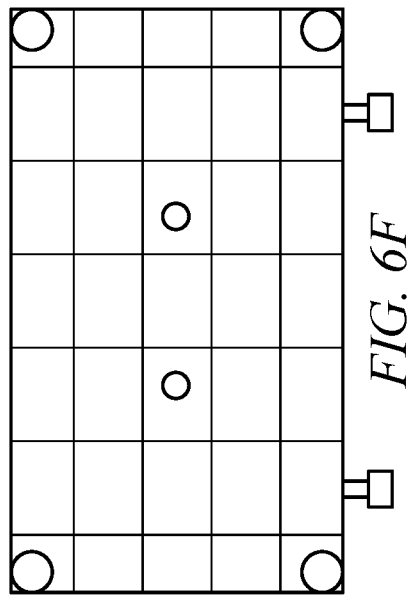
Figure 6H:
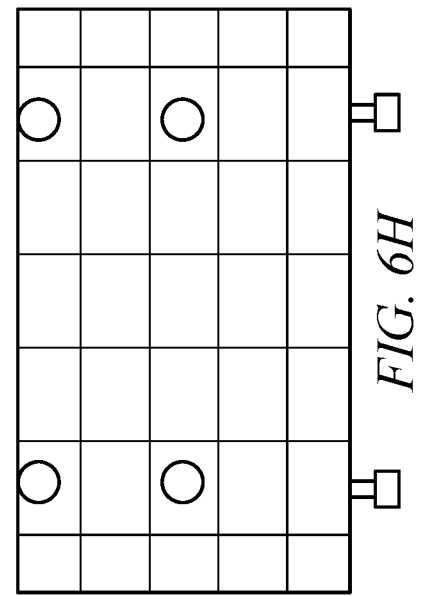
Figure 6E:
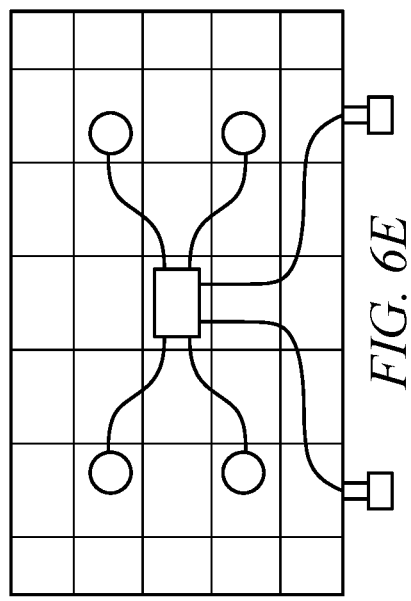
Figure 6G:
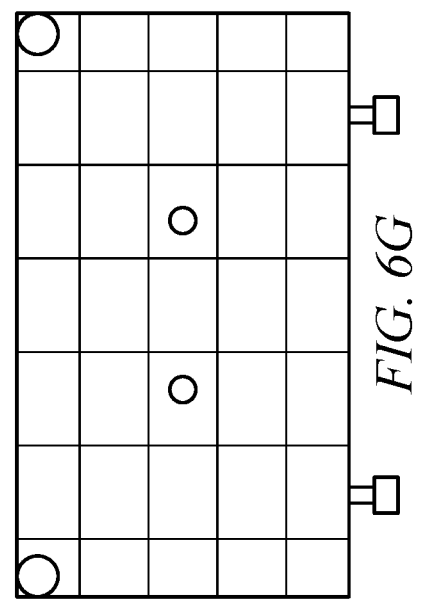

FIG. 5 is an embodiment of an inventory system 500. The inventory system 500 may be installed on shelf where it moves back and forth based on the amount of inventory placed before it or behind it. In one embodiment, adding or removing inventory may cause the inventor system 500 to shift location. The inventory system 500 includes multiple cameras, recorder, IR devices, or combination thereof. In such an embodiment, these devices would be strategically placed to capture various product information, count, distance to the closest/furthest product, etc. In one embodiment, the inventory system 500 includes forward facing cameras that can identify products or capturing images that facilitate identifying products. In other embodiments, the inventory system 500 includes cameras that are downward facing that can count inventory using delta between captures images over a period or captured due to a predetermined event.

For example, a cooler may include an inventory system 500 that is designed to identify products and inventory each product. As such, cameras may be placed in the front of the cooler facing the back of the cooler. When needed, those images may then be verified against a planogram to ensure that products are in the correct position and/or the baseline setting of the items in the cooler is accurate. More cameras may be place on a tray facing down. These cameras capture images that determine the difference between the last image and another image captured, for example, at a "door open" event. The delta between these images determines if products have been removed or added to the cooler. The location of the movement and the product identification cameras may be correlated to identify the exact product added/removed and from which location in the cooler.

As such, in one embodiment, the change in location helps determine the amount of inventory. For example, the inventory apparatus 100 is installed and calibrated. At first stock (first product is being added), the inventory apparatus 100 captures image(s) and determines the product being added is a water bottle. The image(s) taken make capture any portion of or the entire product. Based on the images, a numeric value may be given to identify a product. The numeric value may match or be within a range of values on a database. The database may provide the product size. In an embodiment, the size of the product is learn by the inventory system 500 over time via the inventory apparatus 100. Utilizing the size information and the amount of movement (or change in distance), the amount of inventory or stock change is determined by the inventory apparatus 100. Thus, the inventory system 500 is capable to learn much about a product, cross reference other devices and databases to further connect information and utilize the knowledge for providing data and/or real-time inventory information.

The inventory system 500 may communicate images, data or specific information with other systems, such as an inventory archive system or database or an inventory alert system. Such communication may occur over wired or wireless network using a communication module.

FIGS. 6A-6H are embodiments of a tray inventory system. The tray may include one or several cameras. One or more of the cameras may point up or down to monitor activity or inventory on the tray. The tray with the camera(s) may attach to a wire shelf or any other type shelf. One or more of the cameras may use a fish-eye lens. The inventory system may be triggered by a velocity trigger, an open-door trigger, or a change in temperature or pressure. In one embodiment, the trigger causes one or multiple image capture, which may be used to create a mesh. The tray may also include a display, such as an LCD display. Such an embodiment may be utilized in coolers, warehouse, retail, etc. The tray for inventory monitoring is beneficial in stock identification, inventory analysis, sensing velocity, product matching, etc.

Such a system offers many advantages, such as, stock identification, planogram compliance, inventory analysis, stock velocity, amount of stock, autonomous vending, etc. In some cases, such a system may be used in a cooler in combination with a lock mechanism and payment module. Thus, a person may trigger the system with a payment option or a person identification element that connects to a payment option. As a result, the system then unlocks the door and allows the person to purchase items from the cooler. As the person closes the door, the inventory system captures images of the shelves and determine the difference between the last images taken of the shelves and the images taken after the purchase. The difference/delta between the two images determines the products purchased. The product purchased are then reported to the payment module or the person identification system. The purchase is then finalized, and the person is charged for the purchased goods. In one embodiment, an imaged may be captured before door opening and after door close to be used to determine the delta or the items purchased. In other embodiments, the initial image is captured at a predetermined time or event.

It will be appreciated by those skilled in the art that the disclosed embodiments provide a system which embodies significantly more than an abstract idea including technical advancements in the field of data processing and a transformation of data which is directly related to real world objects and situations. Specifically, the disclosed system and methods increase the efficiency of a computer network by identifying a target audience for advertisements without collecting and parsing consumer information. Further, the disclosed system and methods increases the speed of processing purchases by eliminating the wait time in order to complete the purchases.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

What is claimed is:

1. An inventory system to be used in a cooler, comprising:
   a power module provides power to the inventory system from at least one of an electric source, battery, WIFI charge, wireless charge or combination thereof;
   a computer processor coupled to the power module;
   a memory module coupled to the computer processor;
   an image capturing module coupled to the computer processor;
   a movement module coupled to the computer processor;
   wherein the movement module is configured to:
      determine if a movement has occurred in an area being imaged within the cooler,
      in response to determining that a movement has occurred, determine if the movement meets a threshold, and
      in response to the movement meeting the threshold, trigger the image capturing device to capture images of products in the cooler.

2. The inventory system of claim 1, further comprising at least one of a light source, a lock mechanism and a payment module, wherein the payment module at least one of identifies individuals accessing inventory or facilitate payments from individuals making a payment.

3. The inventory system of claim 2, wherein the payment module facilitates the unlocking of the cooler when payment charges are confirmed.

4. The inventory system of claim 1, wherein the image capturing module comprises at least one of one or more cameras, one or more IR module and one or more video recorders.

5. The inventory system of claim 4, wherein the one or more cameras are placed in at least one of above the inventory and facing the inventory.

6. The inventory system of claim 4, wherein the one or more IR module is place in at least one of facing the inventory or behind the inventory.

7. The inventory system of claim 1 further comprising a communication module to communicate data over at least one wired and wireless network.

8. The inventory system of claim 7, wherein data is bi-directionally communicated with an inventory database.

9. An inventory apparatus executing an inventory method, the inventory method comprising an inventory system to be used in a cooler, comprising:
   a power module provides power to the inventory system from at least one of an power source, battery, WIFI charge, wireless charge or combination thereof;
   determining if a movement has occurred in an area being imaged within the cooler,
   in response to determining that a movement has occurred, determining if the movement meets a threshold, and
   in response to the movement meeting the threshold, capturing an image of inventory on a shelf in the cooler; and
   determining and communicating the difference between the captured image to previous image, wherein the previous image resembles the status of the inventory prior to the movement.

10. The inventory method of claim 9, wherein the communication is with an inventory database.

11. The inventory method of claim 9 further comprising at least one of:
   receiving validation of payment authorization;
   identifying a person;
   unlocking a cooler door;
   using IR to determine a distance from an object, wherein the change in distance facilitates inventory counting.

12. The inventory method of claim 9, further comprising:
   capturing an image of inventory in response to a trigger, the trigger comprising at least one of an open door, a change in light, and a change in pressure.

* * * * *